(No Model.)
T. L. SMITH.
UNDERGROUND WIRE CONDUIT.
No. 293,533. Patented Feb. 12, 1884.
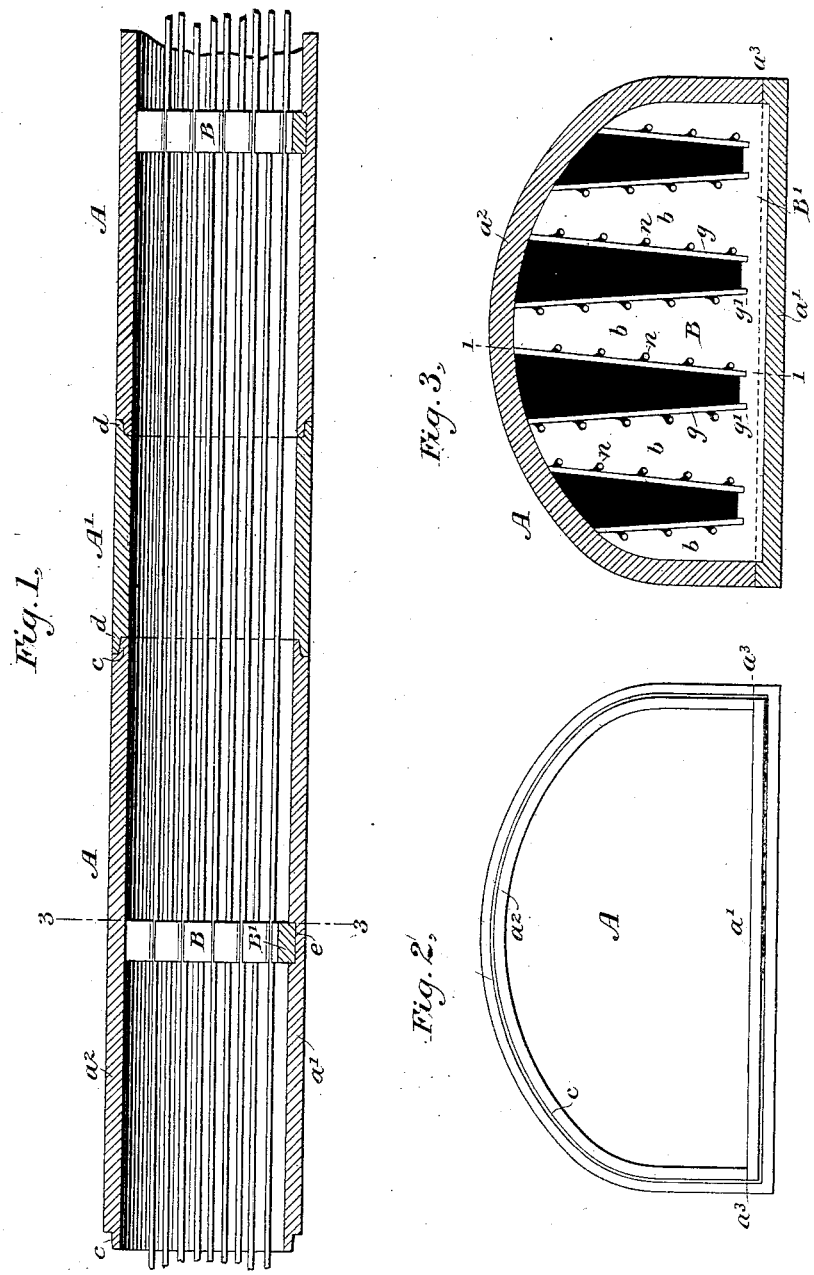
WITNESSES
Geo. W. Breck.
Dav. W. Edgecomb
INVENTOR
Thomas L. Smith
By his Attorneys
Pope Edgecomb & Butler

UNITED STATES PATENT OFFICE.

THOMAS L. SMITH, OF NEW YORK, N. Y., ASSIGNOR OF ONE-HALF TO DANIEL A. MATHEWS, OF SAME PLACE.

UNDERGROUND WIRE-CONDUIT.

SPECIFICATION forming part of Letters Patent No. 293,582, dated February 12, 1884.

Application filed December 14, 1883. (No model.)

*To all whom it may concern:*

Be it known that I, THOMAS L. SMITH, a citizen of the United States, and a resident of the city, county, and State of New York, have invented certain new and useful Improvements in Underground Wire-Conduits, of which the following is a specification.

My invention relates to certain improvements in the construction of tubes or conduits for holding underground electric conductors; and the object of my invention is to provide a convenient and inexpensive method of laying and protecting the several conductors, of preventing their contact with each other, and of affording means of access to the same for examination, and for the attachment of other conductors with the least disturbance to the system.

The invention consists, generally, in constructing a conduit in sections of a considerable length, having one or more supporting-bridges placed at suitable points within the same, and alternating with similar sections of less length and constructed without wire-supporting bridges. The walls of the conduit are constructed in two parts, which are fitted together in a suitable manner, as hereinafter described, and which permits the upper sections of the shorter conduits to be readily removed when it is desired to obtain access to the inclosed conductor. The bridges are constructed in a novel form, which secures a proper separation of the conductors and permits the individual conductors to be handled without disturbing the other conductors of the system. Several other details of construction are also involved in the invention, as will be hereinafter fully described.

In the accompanying drawings, which illustrate my invention, Figure 1 is a vertical section of the tube or conduit which I employ for holding the conductors. Fig. 2 is an end view of one of the longer sections; and Fig. 3 is a cross-section through the line 3 3 of Fig. 1, showing the form of bridge which I employ for sustaining the several conductors.

In Fig. 1, A A and A' represent three separate lengths of the conduit which I employ for holding the conductors, the lengths A A being equal, while the length A' between them is shorter. The material which I prefer to employ for the conduit is ordinary clay, preferably glazed to exclude moisture, and a cross-section of the same, as shown in Figs. 2 and 3 is preferably flat on the bottom and arched on the top. The bottom $a'$ is laid upon the flat bottom of the trench, which has been dug for the purpose, and the upper portion, $a^2$, rests upon the outer edge of the base at $a^3$, fitting closely thereto. The ends of each of the longer sections of the conduit have a projection, $c$, (shown in Figs. 1 and 2,) of the inner over the outer portion, while the ends of the shorter section, A', have a projection, as shown at $d$, Fig. 1, of the outer over the inner portion of the edge. It will thus be seen that in laying the several pieces which compose the bottom of the conduit those forming the bottoms of the longer pieces will project over, and the ends will rest upon the ends of those pieces forming the bottoms of the shorter sections, while, on the other hand, the ends of the sides and tops of those pieces forming the shorter sections will project over and rest upon the tops of the ends of the longer pieces. The object of this arrangement, as well as of having the short lengths, as described, is that these short lengths may be easily removed from their place, thus allowing the wires to be reached for the purpose of examining them at any point without having to remove the longer sections, and also for the purpose of attaching other conductors to those in the conduit.

In Fig. 1, B represents a cross-section along the line 1 1 of Fig. 3 of the bridge which I employ for sustaining the conductors, showing its position in the middle of the longer section of the conduit; and Fig. 3 represents the same in elevation. A bridge is placed in the middle of every one of the longer lengths of the conduit; but no bridge is placed in the shorter lengths. The bridge B is preferably made of clay baked and glazed, so as to insulate the several wires from each other; but any other suitable material will equally serve the purposes of the invention—that is, an insulating material for naked wires and any desirable material for insulated wires. The bottom of the bridge B is set in a suitable groove, $e$, in the bottom of the conduit A, and is thus held in its place. The form of the bridge which I employ is represented in Fig. 3. It consists of the foot or base B' and several tapering upright portions, $b\,b\,b$, separated from each other by suitable spaces, and in the sides of these upright portions are made suitable notches, $n$, for receiving the wires. A groove is made in the sides and upright part of the arched top $a^2$ of the conduit, so that the upper ends of these tapering portions of the bridge will enter and be held firmly in place in the same way as the bottom of the bridge is held in its groove in the base. It will be seen that my invention provides for securely holding the wires separate from each other, and the shape of the bridge will permit the placing of a larger number of wires without danger of interference. The lengths which I prefer to employ for the conduit are about six feet for the longer and from two to two and a half feet for the shorter sections. This brings the bridges at suitable distances apart for holding the wires and preventing their coming in contact. The slanting sides of the upright portions of the bridge allow any wire to be readily elevated from its place or reached for any purpose.

The invention is more especially intended for ordinary naked wires, and for this purpose the glazed clay or other similar material is an excellent and cheap insulator. It is evident, however, that metal may be used both for the conduit and for the bridge also, if desired, when insulated wires are to be conveyed. In order to more effectually insulate the wires from each other and prevent their getting out of place, I cover each of the sides of the upright portions of the bridge, which has the notches for supporting the wires, with a plate of glass, $g$, which is preferably made somewhat wider than the thickness of the bridge. The lower edge of the glass plates rest in suitable grooves, $g'$, in the bridge, at the feet of the upright portions, and the upper end in similar grooves made for the purpose in the top. After all the wires are in position, these plates of glass are put in their places, and the upper portion of the conduit being then put in its place, the plates and wires are securely held, and the wires will not be displaced should they be handled at a distance from the bridge. At the same time the glass plates prevent any moisture which might accumulate from forming electrical connections between the several wires.

I claim as my invention—

1. In an underground telegraph conduit or pipe, the bridge B, having the upright parts $b$, in which are made the notches $n$, for supporting the wires, and having the sides of said uprights covered with glass plates, substantially as and for the purpose described.

2. The combination, substantially as hereinbefore set forth, of a pipe or conduit for underground electric conductors, consisting of the long and short sections A and A', placed alternately, and the bridge or support B, for the conductors, placed approximately in the middle of each of the longer sections, and consisting of the base B' and the upright parts $b$, in which are the notches $n$, for supporting the wires, and having said uprights covered with glass plates.

3. The combination, substantially as hereinbefore set forth, of a pipe or conduit for underground electric conductors, consisting of the sections A and A', of two different lengths, so constructed that the cover or upper part of the short sections may be removed without disturbing the longer sections, and the bridge or support B, for the conductors, placed approximately in the middle of each of the longer sections, and consisting of the base B' and the upright parts $b$, in which are the notches $n$, for supporting the wires, and having said uprights covered with glass plates.

In testimony whereof I have hereunto subscribed my name this 13th day of December, A. D. 1883.

THOMAS L. SMITH.

Witnesses:
  DANL. W. EDGECOMB,
  CHARLES A. TERRY.